United States Patent [19]

Eiberger

[11] Patent Number: 5,170,296
[45] Date of Patent: Dec. 8, 1992

[54] APPARATUS FOR REPRODUCING MAGNETICALLY RECORDED SIGNALS WITH AMPLITUDE CORRECTION

[75] Inventor: Berthold Eiberger, Ober-Ramstadt, Fed. Rep. of Germany

[73] Assignee: BTS Broadcast Television Systems GmbH, Darmstadt, Fed. Rep. of Germany

[21] Appl. No.: 442,847

[22] Filed: Nov. 29, 1989

[30] Foreign Application Priority Data

Nov. 30, 1988 [DE] Fed. Rep. of Germany ....... 3840291

[51] Int. Cl.$^5$ ............................................. H04N 5/78
[52] U.S. Cl. .................... 360/33.1; 360/22; 360/67; 358/315; 358/335
[58] Field of Search ............... 360/67, 33.1, 22, 27, 360/38.1; 358/315, 318, 335, 336

[56] References Cited

U.S. PATENT DOCUMENTS

| 4,495,529 | 1/1985 | Gustafson | 360/67 X |
| 4,498,111 | 2/1985 | Rijckaert et al. | 360/67 X |
| 4,517,612 | 5/1985 | Rijckaert et al. | 360/67 |
| 4,991,034 | 2/1991 | Sato | 360/67 |
| 5,003,413 | 3/1991 | Miyazaki | 358/315 X |

FOREIGN PATENT DOCUMENTS

0229925A2  7/1987  European Pat. Off. .

OTHER PUBLICATIONS

"The 4:2:2 Component Digital VTR", by T. Eguchi et al, *International Broadcast Engineer*, Sep. 1986, pp. 38-42.

*Primary Examiner*—Andrew L. Sniezek
*Attorney, Agent, or Firm*—Frishauf Holtz Goodman & Woodward

[57] ABSTRACT

Data signals recorded in oblique tracks on a magnetic tape, after they are picked up, preamplified and prefiltered, are rectified and converted to digital values representative of amplitude in respective segments distributed over track lengths. For each segment position in a track, the values are averaged and inverted by a ROM and stored in a RAM at track segment addresses. The values thus stored are converted into analog form and then used as multipliers in a multiplication stage following the preamplification and prefiltering. The output of the multiplier can readily be shaped into unambiguous data signals for further processing.

3 Claims, 1 Drawing Sheet

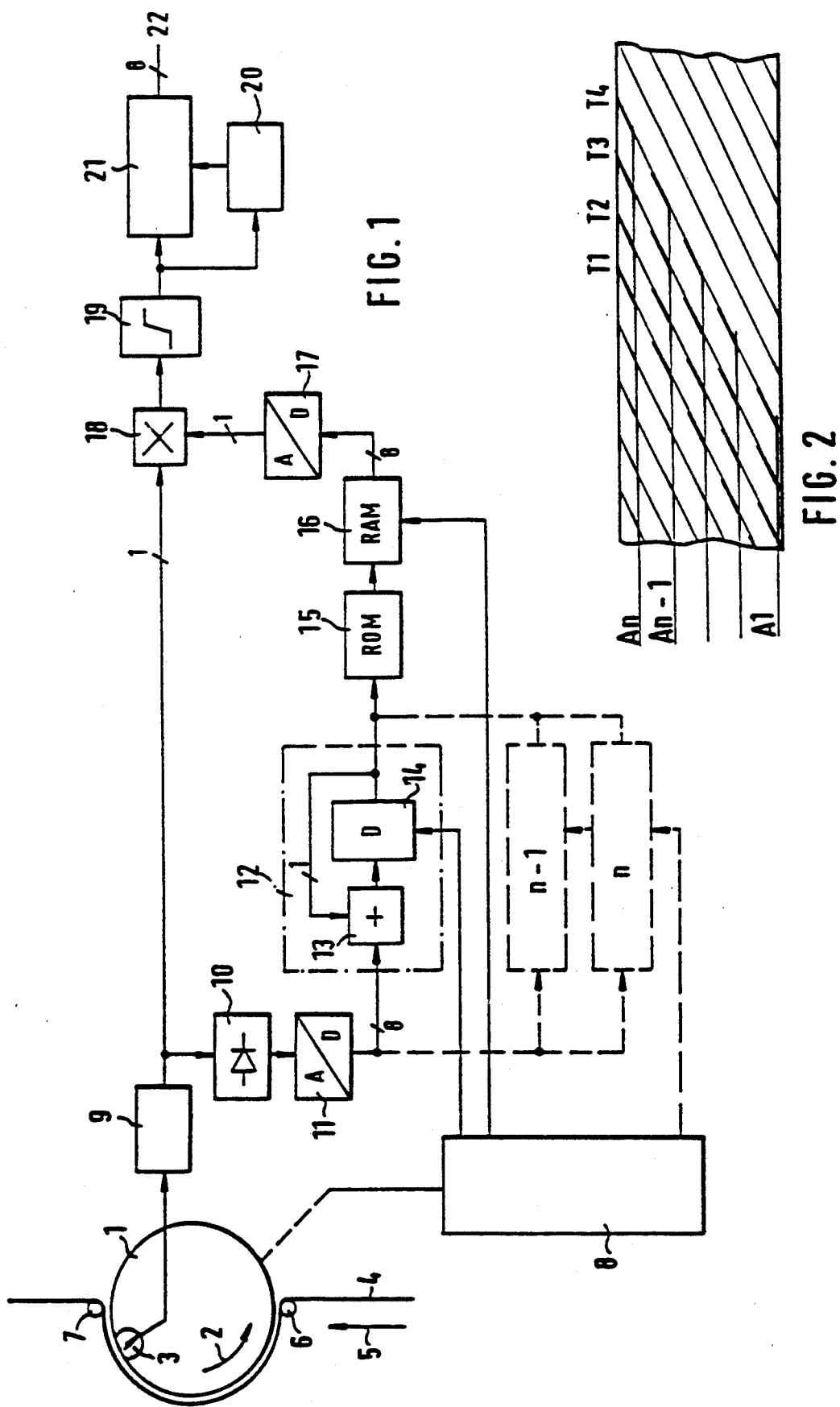

APPARATUS FOR REPRODUCING MAGNETICALLY RECORDED SIGNALS WITH AMPLITUDE CORRECTION

This invention concerns playback of data signals recorded on magnetic tape in oblique tracks by revolving magnetic heads, and particularly concerns the reproduction of such signals in which the steps of removing distortion and level fluctuations are performed prior to further processing.

Rotary magnetic scanning devices have been used increasingly for recording data on magnetic tape in oblique tracks. The commonly used rotary scanning device equipped with several rotary magnetic heads is enveloped helically by a magnetic tape, so that as the tape advances while the scanning device rotates, tracks are recorded that run obliquely to the edge of the tape. Such recording can be accomplished for data signals at a data rate above 100 Mbit/s. The reproduction of the recorded data has its problems, however, because account must be taken not only of the electrical properties of the magnetic transmission channel, but also of some mechanical shortcomings.

Thus, for example, in the case of a digital recording, the reproduced signal, as picked up, is no longer in digital form because of the bandpass characteristic of the magnetic transmission channel. The reproduced data signal, furthermore, is subject to signal level deviations because of differences in the head-to-tape contact over the helical envelopment path of the tape around the rotary scanning device. In addition, mechanical wear in the region of the mirror-like contact surface of the magnetic head affects the reproduction signal level of the data signal. Finally, tracking errors of the magnetic pickup head lead to signal level fluctuations in the reproduced signal.

For avoidance of signal level fluctuations in a reproduced data signal, it is known from the September 1986 issue of "International Broadcast Engineer", pp. 38–42, to amplify the signal picked up from the magnetic tape, subject it to low-pass filtering and to compensate distortion at high frequencies and thereafter supply the prepared reproduction signal to a regulation loop composed of a controlled amplifier, a buffer amplifier and a peak detector. In that way the amplification of the controlled amplifier is varied in a manner dependent upon the peak values in the output signal of the controlled amplifier. Then, in further stages, the reproduced signal now having constant amplitude is converted into a decodable data signal. This known method has the disadvantage that the regulation loop operating as an automatic signal level control fails to detect or to regulate out those signal level errors which are of short duration. The cause of that difficulty is the low regulating speed of such a regulating loop. Signal level errors at a track beginning and at a track end can therefore lead to disturbances in data synchronization.

A reproducing equipment for recorded data is known from EP 0229925 A2 in which a table of various amplification data is deposited in a memory for a controlled amplifier. The stored amplification data determine the degree of amplification of the data signal in the controlled amplifier in a manner dependent upon the momentary cylinder position of the scanning magnetic head reading the record. Since in the table only predetermined fixed amplification data are stored, however, dynamic signal level changes cannot be detected or corrected during the reproduction operation.

SUMMARY OF THE INVENTION

It is an object of the present invention to provide apparatus for reproduction of magnetically recorded data, in the use of which signal level changes in the reproduced data signal which repeat systematically in every oblique track or in the oblique track pattern can be detected and corrected.

Briefly, after preliminary correction for distortion by preamplification and filtering the reproduced signals are multiplied by a signal which is derived from amplitude values of the distortion-corrected signal at defined sections of the recorded oblique tracks. In particular the amplitude values applying to particular track segments are detected over a number of (preferably at least three) oblique tracks and then inverted and preferably stored to provide a factor for multiplication of the reproduced signal.

The apparatus of the invention have the advantage that characteristic signal level fluctuations present within the oblique track can be compensated for, without the previously inevitable delay, by means of an automatic signal level control in the previously normal form of a regulation loop without any time delay.

It is particularly advantageous that even those signal level fluctuations which result from scanning errors can be detected and corrected along with the normal deviations of velocity of the reproduction operation.

BRIEF DESCRIPTION OF THE DRAWINGS

The invention is best further described by way of illustrative example, with reference to the annexed drawings, in which:

FIG. 1 is a block circuit diagram of apparatus for carrying out the method of the invention, and FIG. 2 is a schematic representation of a track pattern recorded on a magnetic tape.

DESCRIPTION OF THE ILLUSTRATED METHOD AND EMBODIMENT.

In FIG. 1 there is shown a rotary disk or wheel 1 which rotates in the direction of the arrow 2. On the periphery of such a rotary body 1 there are usually affixed several magnetic heads. For reasons of simplification of the drawing only one playback magnetic head 3 is shown in the drawing and the rest of FIG. 1 is shown as if it were the only magnetic playback head in the rotary body 1.

The rotary body 1 is part of a mostly stationary drum-shaped scanning device around which the magnetic tape 4 is looped in a helical path. The guiding of the tape 4 in the direction 5 is provided by guide elements 6 and 7. The rotary speed of the disk 1 and the tape advance speed of the magnetic tape 4 are regulated in a known way by a control unit 8 of said compensating circuit means.

As a result of the helical looping of the magnetic tape 4 around the scanning device, tracks T1, T2, T3 and T4 are recorded, as shown in FIG. 2, disposed obliquely to the tape edge. In the case of a data recording, the signal current corresponding to the data being recorded flows through the head windings of recording heads (not shown) to magnetize the magnetic tape 4 with magnetic flux variations corresponding to the current variations. In playback operation the data signal stored on the magnetic tape 4 is picked up by a playback magnetic head 3 which scans the recorded oblique tracks T1 to T4. As mentioned in the introduction, the reproduced data signal has signal level fluctuations resulting from electrical and mechanical shortcomings of the magnetic transmission channel which lead to errors in the regeneration of the data signal.

In accordance with the method of the invention the amplitude values of particular segments of a track are determined from the preampilified and preliminarily distortion-compensated (pre-equalized) signal of the playback magnetic head 3. From the amplitude values obtained a signal is derived by which the signal provided at the output of the stage 9 is multiplied. The signal derived from the amplitude values is advantageously generated from the track segments of several parallel and neighboring oblique tracks by an averaging procedure. In the track pattern of FIG. 2 each of the oblique tracks T1 to T4 has five small track segments respectively corresponding to the lengthwise stripes A1 A2, A3, A4 and A5 of the tape. These segments of the tracks are used to provide contributing values for derivation of a multiplier signal. The position and length of the track segments are selectable in any desired way. In any event, at least segments at track beginning and at track end as well as at the track middle should be provided in order to compensate for deterministic (systematic) signal level fluctuations in the playback signal.

In general it should be assured that the position and number of the track segments used for contributing values are selected in a manner dependent upon the mechanical precision of the drive mechanism of the apparatus. The measurement of the envelope of the preamplified and pre-equalized playback signal provide a starting point of reference. Recurring signal level fluctuations at the beginnings and ends of the tracks require for example a corresponding evaluation of amplitude values in the track segments which are located at the track beginning and the track end.

As shown in FIG. 1 the preamplified and pre-equalized signal on the magnetic head 3 first feeds to a rectifier stage 10. The rectifier stage is designed so that the average values for the duration of the respective individual track segments are generated which are then converted by a following analog-to-digital converter 11 into 8-bit wide digital words. A digital accumulator 12 serves to average amplitude values belonging to a sequence of similarly located segments of a sequence of tracks scanned by the playback head 3. Other accumulators shown in broken lines are provided for other sets of track segments. The number of accumulators corresponds to the number of selected track segments per track.

In the illustrated example, the accumulators each consist of an addition stage 13 followed by a D register 14. The output of the D register 14 feeds back data to an input of the addition stage 13, so that in a manner dependent on timing signals by the servo drive 8, several of the amplitude values provided by the A/D converter 11, for example the amplitude values of the several track segments A1 in the respective tracks T1 to T4, may be summed together. These values are then supplied to the address input of read-only memory 15, in which precalcuated values are stored which correspond essentially to an inverting and a possibly useful modification of the amplitude values provided by the accumulators 12. The inverted amplitude values are then written into a random-access memory 16. These values are read out in a manner dependent upon the phase of rotation of the rotary body 1 under control of the control stage 8, so that there can be continually provided through a digital-to-analog converter 17 the values of compensating factors for the respective individual track segments of every track. The signal provided by the preliminary processing stage 9 is multiplied by the signal from the digital-to-analog converter 17 in the multiplier 18. Systematic signal level fluctuations are thus avoided in a manner dependent upon the amplitude values recognized for the respective track segments.

The playback signal which is now constant in its amplitude is then supplied to a stage 19 which now converts the playback signal, which up to this point has been treated as an analog signal as an analog signal back into a digital data signal. Such a stage 19 can be constituted in the form of a threshold switch. The output of the stage 19 is a serial digital data signal and from it the clock rate signal is regenerated in a pulse regenerator 20 in a known way. The regenerated clock signal is provided to signal processor 21 in which the serial data signal is converted into bit parallel form for further processing. At the output 22 of the processor 21 there accordingly is provided a digital data signal with a word width of eight bits for further signal processing steps.

Although the invention has been described with reference to a particular illustrative example, it will be recognized that variations and modifications are possible within the inventive concept. For example the averaged and inverted average values may be stored in one part of a dual memory for use in the next track scan while the most recent complete set of such values is being sequentially retrieved for use in a current track scan.

I claim:

1. Apparatus for reproducing digital data signals recorded in oblique tracks on a magnetic tape having magnetic head and scanning means for playback of data signals from an oblique track on magnetic tape for producing a pickup digital data signal, a servo drive (8) for said scanning means capable of providing timing signals, preamplifying and pre-equalizing means for said pickup digital data signal for producing therefrom a preliminary playback data signal, and further comprising:

a rectifying circuit (10) for rectifying said preliminary playback data signal and having a time constant for obtaining a single signal value for each segment of a plurality of sets of a plurality of segments similarly disposed on each of successively scanned oblique tracks, said rectifying circuit having an output;

an analog to digital converter having an input connected to the output of said rectifying circuit and having an output for converting each of said signal values obtained by said rectifying circuit into a multibit digital signal value;

at least three accumulators (12), each having an input connected to the output of said analog to digital converter, for producing sum values each representing an average, of said values provided at said output of said analog-to-digital converter for correspondingly located track segments of at least three neighboring tracks, timing means in said servo drive for producing timing signals at respective timing outputs of said timing means for sequentially activating said accumulators in the track sequence of said segments so that each accumulator will sum only said multibit digital values of a single set of correspondingly located track segments;

read-only memory means (15) for inverting each of said values produced by said accumulators in track sequence of said sets of segments and producing corresponding inverted average values;

write-read memory means (16) for storing said inverted average values for a plurality of track segments in the time sequence in which they are produced by said read-only memory means, and for delivering said inverted average values substantially in synchronism with the presence of corresponding track segments in said preliminary playback data signal, said synchronism being assured by timing of said write-read memory means by a special timing signal therefor produced by said servo drive at a special output thereof;

a digital-to-analog converter (17) connected for converting the inverted average values delivered from said read-write memory means into analog values supplied at an output at said converter, and compensating circuit means, having an input for said preliminary playback signal which is in parallel to the input of said rectifying circuit, for compensating distortion of said preliminary playback data signal by applying said analog values supplied at said output of said digital-to-analog converter to a control input of said compensating circuit means and thereby producing, at an output of said compensating circuit means, an amplitude-compensated playback data signal which is thereby made available for further processing 2. The apparatus of claim 1, wherein said accumulators and said timing means are so arranged and interconnected as to cause said accumulators to produce sum values each representing an average of values provided at said output of said analog to digital converter for correspondingly located track segments of a number of neighboring tracks which is at least four.

3. The apparatus of claim 1, wherein said output of said compensating circuit means is connected to threshold switch means (19) for improving the reliability of the output of said compensating circuit means as a serial digital signal and said output of said threshold switch means is connected to signal processor means (21) wherein said serial digital signal is converted into bit parallel form and is also connected to pulse regenerator means (20) for producing block pulses required by said signal processor means (21) for converting the serial digital signal into a bit-parallel digital signal.

* * * * *